May 15, 1956   F. J. VANDEMARK ET AL   2,745,562
MATERIAL GRIPPING AND HANDLING TRAILER STRUCTURE
Filed April 20, 1953   5 Sheets-Sheet 1

INVENTORS
FRED J. VANDEMARK
RICHARD G. BUCHIGNANI
BY
Weatherford and Weatherford
attys

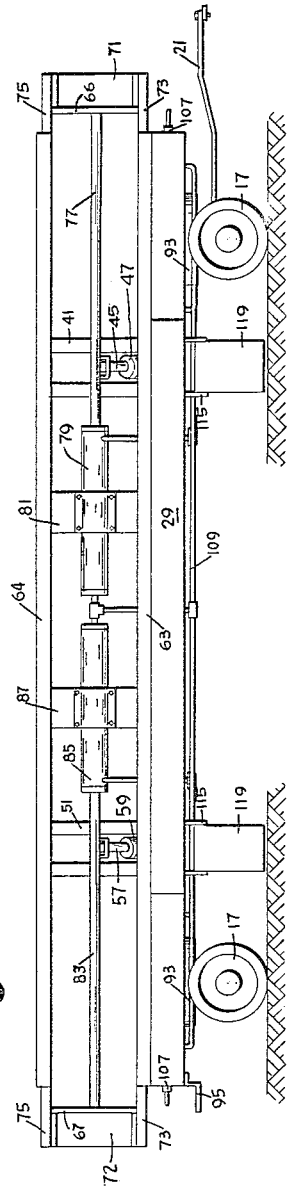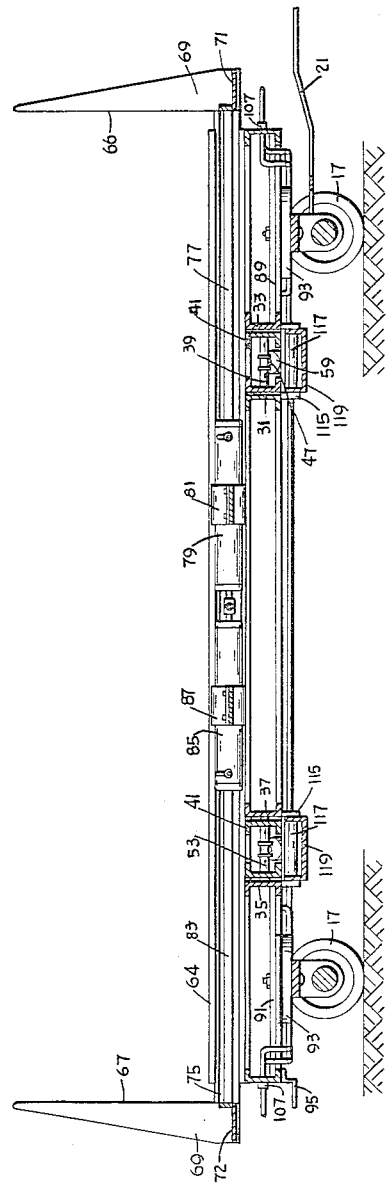

May 15, 1956     F. J. VANDEMARK ET AL     2,745,562
MATERIAL GRIPPING AND HANDLING TRAILER STRUCTURE
Filed April 20, 1953     5 Sheets-Sheet 3

INVENTORS
FRED J. VANDEMARK
RICHARD G. BUCHIGNANI

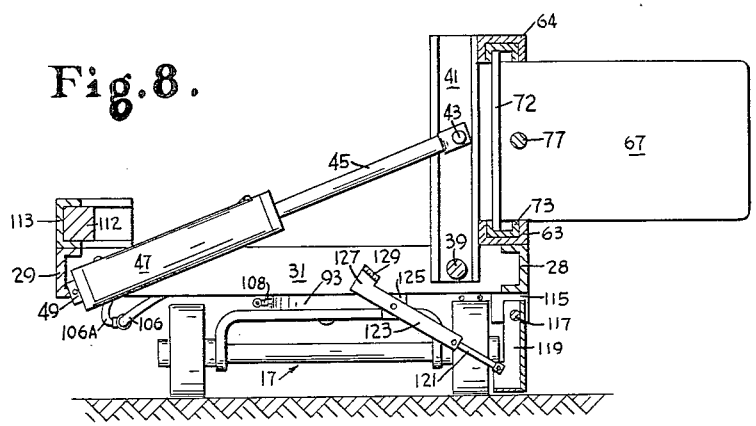
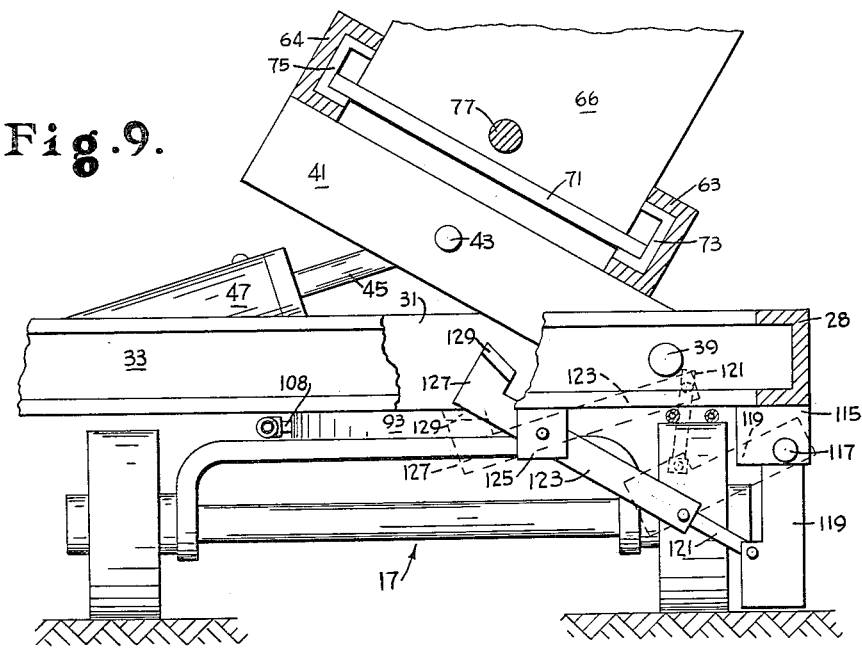

May 15, 1956  F. J. VANDEMARK ET AL  2,745,562
MATERIAL GRIPPING AND HANDLING TRAILER STRUCTURE
Filed April 20, 1953  5 Sheets-Sheet 5

INVENTORS
FRED J. VANDEMARK
RICHARD G. BUCHIGNANI
BY
Weatherford and Weatherford
atty

United States Patent Office 2,745,562
Patented May 15, 1956

2,745,562

MATERIAL GRIPPING AND HANDLING TRAILER STRUCTURE

Fred J. Vandemark and Richard G. Buchignani, Memphis, Tenn.

Application April 20, 1953, Serial No. 349,832

24 Claims. (Cl. 214—77)

This invention relates to certain new and useful improvements in the structure of trailers, particularly of the type adapted for use in warehouses, and more particularly relates to an improvement in such trailers adapting same for mechanical material handling in the loading and unloading of bulky objects, such as bales of cotton.

It has heretofore been considered desirable to provide low-bed trailers for use in shifting objects such as bales of cotton from place to place in warehouses, and frequently it has been considered desirable to employ such trailers in a train consisting of a plurality of units drawn by conventional tractor devices.

In the warehousing art as heretofore practiced there have been considerable and numerous difficulties of a time-consuming and excess-labor-requiring nature inherent in the handling of such objects. Thus in many instances it has been necessary to duplicate the trailer equipment so that when one train of trailers has been loaded and transported to the unloading station the train might be uncoupled and left at the unloading station while another train of empty trailers was drawn back to the loading station, and this process repeated in order to afford time for loading and unloading of the bales of cotton from the trailers proper. In addition it has required the substantial amount of personnel to accomplish the handling of such objects. In many other installations it has been found that mechanical means, such as fork-lift trucks, may be used in loading and unloading the bales from the trailer. However, this has proven extremely difficult and time consuming in requiring a number of movements back and forth in picking up, depositing and withdrawing the bales to and from the trailers, and in addition this particular operation by the use of a fork-lift truck has been substantially limited in the quantity of bales which may be handled at a single time, it generally being considered undesirable to attempt to handle more than two bales at a given moment, with the result that where a trailer is to be loaded with a plurality of bales, a multiple number of operations has been required.

The present invention is particularly adapted to overcome the several problems briefly just mentioned and in particular is adapted to provide a material handling trailer for use in warehousing which is capable of simultaneously mechanically handling a plurality of bulky objects, such as bales of cotton, and which is further adapted to be employed in a train with a number of like material handling trailers and to accomplish self-loading and self-unloading of the trailer, requiring but a single operator who combines the function of tractor-driver, loader and unloader from the tractor seat.

The principal object of the present invention is to provide a self-loading and self-unloading trailer adapted for use in warehouses.

A further object of the invention is to provide such a material handling trailer which includes hydraulic means for engaging bulky objects, such as bales of cotton, and additional hydraulic means for elevating and lowering the objects to and from a loaded position, from and to an unloaded position.

A further object of the invention is to provide mechanical loading and unloading bed means for use in a warehouse trailer, which means comprise a pair of tilting units integrally interconnected by longitudinally disposed beam-like members for simultaneous cooperative action to effect tilting of the loading means about a side pivot to and from a loaded rest position, from and to a tilted position in which portions of the structure have been extended to an unloading or loading position perpendicularly relative to the bed.

A further object of the invention is to provide in connection with a self-loading and self-unloading trailer structure, an automatically operating anti-tipping, retractable leg-and-foot member designed to cooperate with the tilting action of the bed structure.

A further object of the invention is to provide such a retractable and extensible leg-and-foot arrangement which will be completely extended during a preliminary portion of the tilting movement of such bed structure and which will be returned or retracted to folded position only during the latter portion of the return movement of the structure to rest position on the trailer.

A further object of the invention is to provide counterbalancing means effective during operation of the device to prevent overbalancing of same.

A further object of the invention is to provide a hydraulically operated tilting mechanism for material supporting trailer beds; and A further object of the invention is to generally improve the design, construction and efficiency of material handling trailers.

The means by which the foregoing and other objects of the present invention are accomplished and the manner of their accomplishment will be readily understood from the following specification upon reference to the accompanying drawings, in which:

Fig. 3 is a side elevational view of a single trailer illustrating the positions of the elements of the device when full tilted to the loading and unloading position.

Fig. 4 is a longitudinal sectional view taken as on the line IV—IV of Fig. 2.

Fig. 8 is a view similar to Fig. 6, with the parts in tilted position.

Fig. 9 is a fragmentary detailed view on a further enlarged scale, illustrating a retractable brace member for supporting the device.

Figure 10:
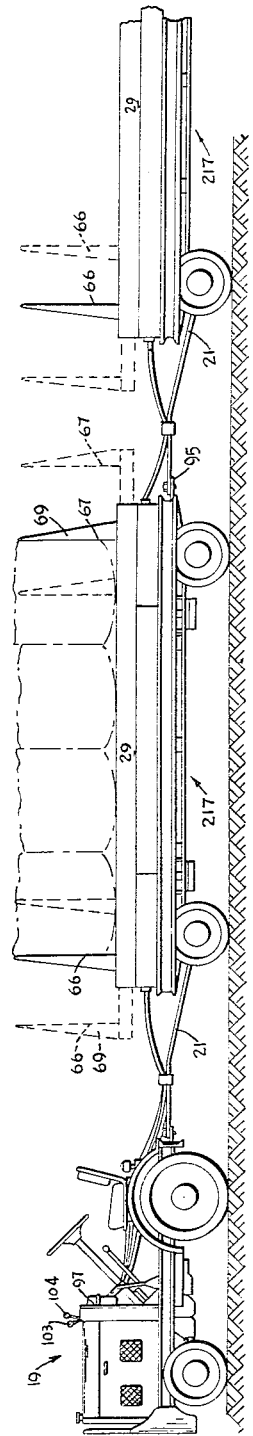
Fig. 10 is a view similar to Fig. 1 of a variation in the invention.
Figure 11:
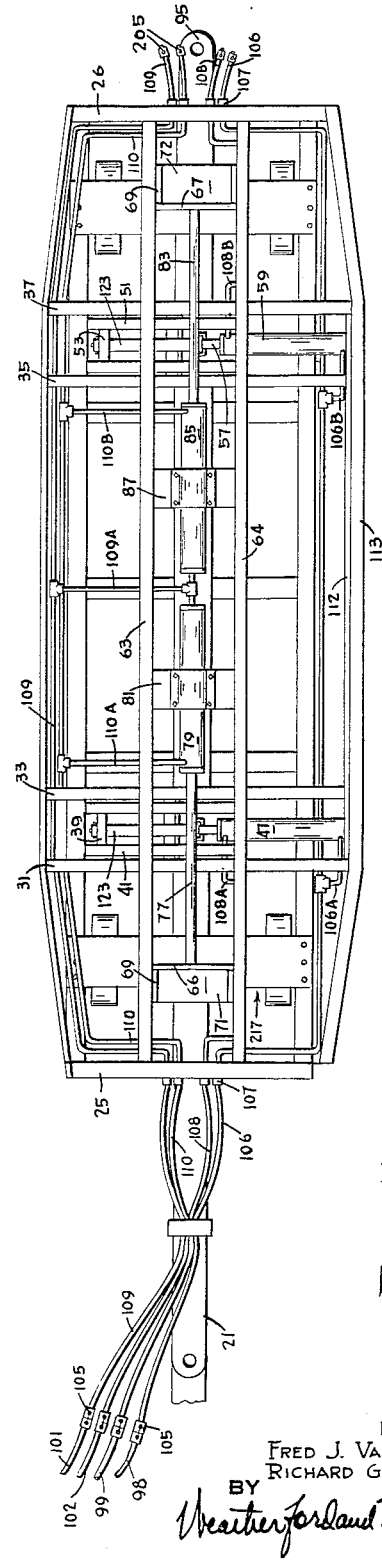
Fig. 11 is a view similar to Fig. 2 of the variation shown in Fig. 10.

Referring now to the drawings in which the various parts are indicated by numerals, it will be seen that the present invention primarily relates to the new and novel structure for the bed of a warehouse trailer, this bed structure being generally indicated at 15. The bed structure 15 is adapted to be mounted on suitable running gear, either wheel trucks 17, as illustrated in Figs. 1 to 8, or a conventional trailer 217, as shown in Figs. 10 and 11. In either event the new trailer construction embodying the present invention may be employed singly or in a train as fragmentarily illustrated in Figs. 1 and 10.

The devices are further adapted to be drawn by and coupled to conventional-type tractors 19, the running gear being provided with a substantially conventional draw bar 21 which is adapted for detachable coupling to a suitable fitting 23 mounted on the rear of tractor 19.

Figure 1:
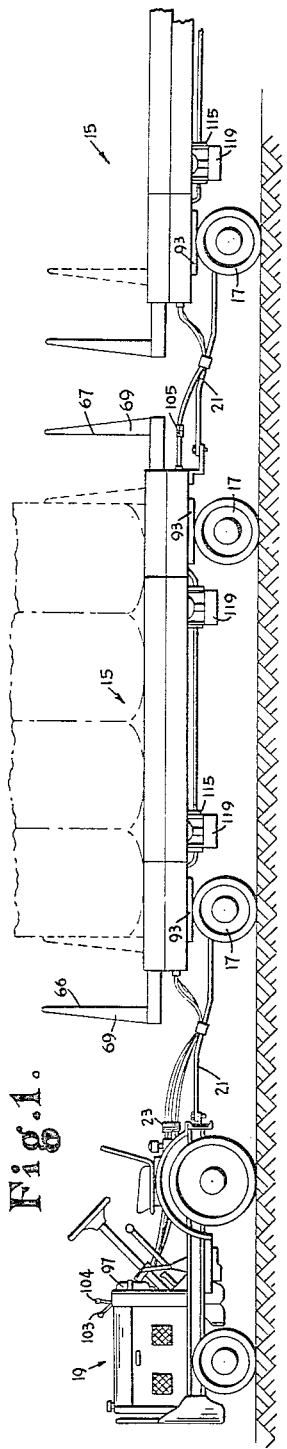
Fig. 1 is a side elevational view of a train employing material handling trailers of the present invention.
Figure 2:
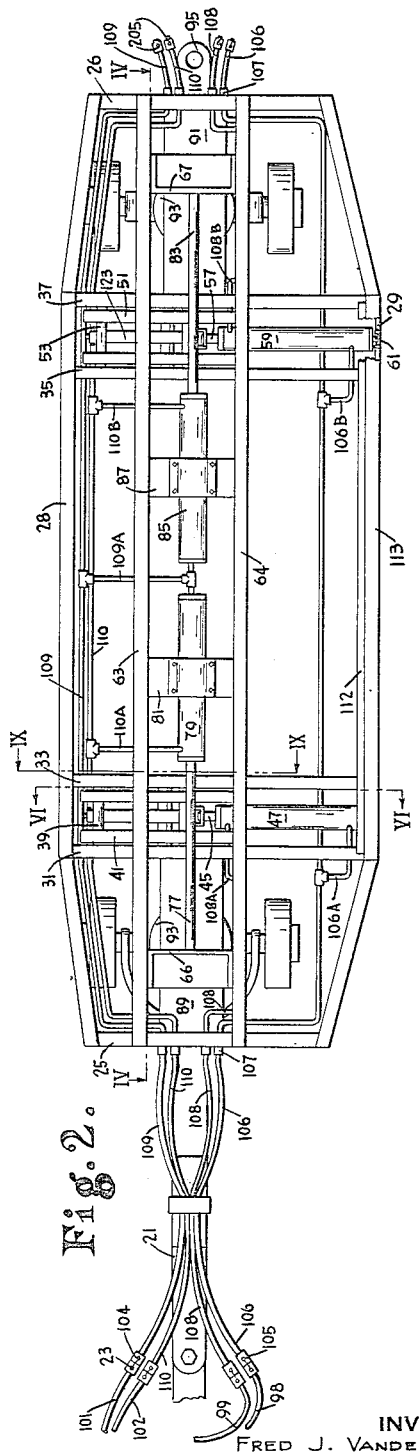
Fig. 2 is a top plan view on an enlarged scale of one of the trailers employing the present invention.
Figure 5:
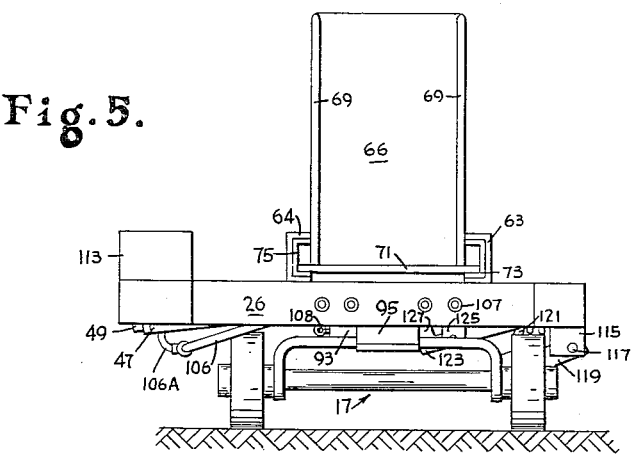
Fig. 5 is an end view of the device of Fig. 2.
Figure 6:
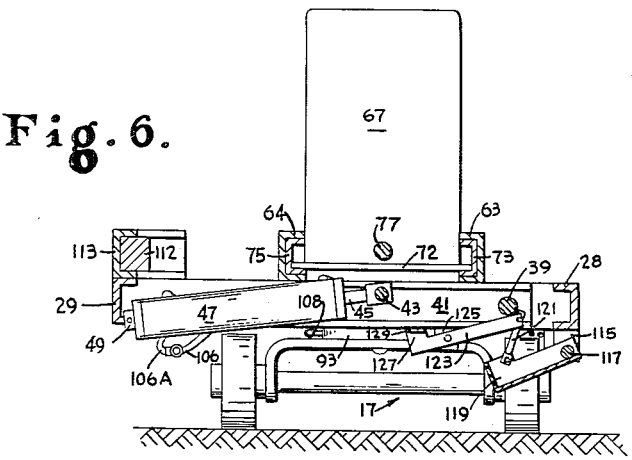
Fig. 6 is a cross sectional view take as on the line VI—VI of Fig. 2.
Figure 7:
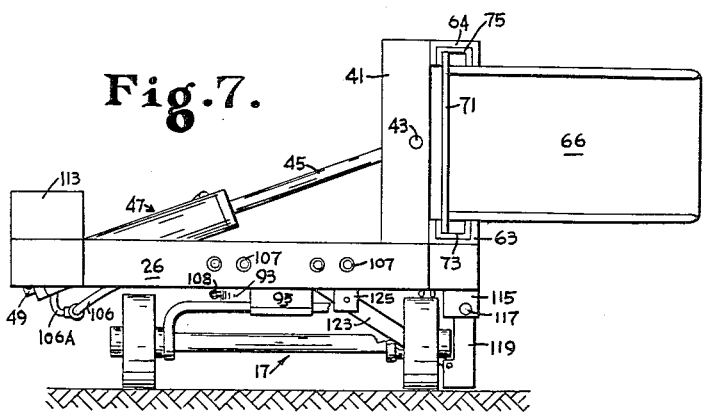
Fig. 7 is a view similar to Fig. 5 illustrating the positions of elements of the invention in full tilted position of the device.

Bed structure 15 comprises front and rear transverse beam members 25, 26 which are preferably formed of channel members disposed edgewise with the web of the channels respectively directed forwardly and rearwardly and with the flanges of the channels turned toward the body of the trailer bed. The front and rear members 25, 26 are connected together by sides 28, 29, which are preferably formed of channel members, and are rigidly secured to the front members 25, 26, preferably integrally, as by welding. It is also preferred that adjacent the respective corners of the bed that the side members 28, 29 be formed with angularly converging front and rear sections, as best shown in Fig. 2. The side members 28, 29, in addition to interconnecting the front and rear members 25, 26, also effectively serve as scuff plates during the use of the device.

Spaced rearwardly from front structural member 25 is a transverse intermediate beam member 31 which is preferably formed of a structural member, such as channel iron, and is disposed with the web of the channel vertical and with the flanges of the channel projecting forwardly therefrom. The opposite ends of the beam 31 are rigidly connected to the side members 28, 29. The beam member 31 forms the front attachment member or channel for a forward tilt unit, to be described more in detail hereinafter.

Spaced rearwardly from the front attachment member 31 is a second attachment member of the front tilt unit comprising a structural beam-like member 33, similar to the beam member 31, with the exception that the flanges of the beam are preferably directed rearwardly. Like the member 31, the beam 33 is rigidly connected at its opposite ends to the side members 28, 29, and the member 33 forms the second member of the pair of attachment members for the forward tilt unit.

Similarly adjacent rear member 26 and spaced forwardly therefrom, in manner substantially identical with the spacing of members 31, 33 from front member 25 are a rear pair of attachment members 35, 37 which are disposed in spaced relation substantially identical to the relationship between members 31, 33 and the members 35, 37 are formed as beam-like members, preferably formed of channel iron disposed with the webs of the channel respectively vertical with the flanges of the member 35 projecting forwardly therefrom. As in the case of the attachment members 31, 33, attachment members 35, 37 are respectively rigidly attached to the side members 28, 29, preferably as by welding.

It thus will be seen that the bed structure includes a base frame-work consisting of the transverse members, including front and rear beam members 25, 26, and the transverse attachment channel-like members 31, 33, 35, 37, the same being joined together in rigid unitary fashion by the side members 28, 29.

Adjacent but spaced inwardly from the side member 28 a shaft 39 is journalled in and spans between the respective webs of the channel members 31, 33. A pair of tilt members 41 are fixed to shaft 39 adjacent one end of the tilt members, which are preferably formed of short sections of channel and are disposed respectively closely adjacent the members 31, 33, with the webs of the members 41 in freely sliding relation to the webs of attachment members 31, 33. The tilt members 41 are thus rockably and tiltably connected to the members 31, 33 by the rock shaft 39. Adjacent the opposite ends of the tilt members 41 a second shaft 43 is turnably mounted in the webs of the channels 41 and provides a connection for a piston rod 45 forming part of a double-action hydraulic tilt cylinder-and-piston assembly, the piston rod 45, in conventional manner, being extensibly connected into the cylinder 47 of the assembly and being adapted to be extended therefrom and retracted thereinto through hydraulic actuation. The end of the cylinder 47 is rockably connected as at 49 to the side member 29.

Similarly mounted between the channel attachment members 35, 37 of the rear tilt unit are a pair of tilt members 51, preferably formed of short channel sections interconnected adjacent one end by the transverse shaft 53 which is journalled in the respective webs of the channels 35, 37, so as to rockably and tiltably connect the tilt channels 51 to the channels 35, 37 of the rear tilt unit. Similarly a connecting shaft 55 is turnably mounted adjacent the opposite ends of the tilt channels 51 and forms a connection for a piston rod 57 of a second double-action hydraulic tilt cylinder-and-piston assembly, the end of the cylinder 59 of the assembly being rockably connected as at 61 to the side member 29.

Seated on the bed structure and extending from end to end thereof are a pair of longitudinal beam members 63, 64 which are preferably formed of channel members and are seated on the transverse members of the underlying frame with the webs of the channels 63, 64 disposed vertically and with the respective channels being disposed in inwardly facing condition with their flanges projecting inwardly toward the opposite channel member and toward the longitudinal mid line of the bed structure. The channel members 63, 64 constitute longitudinal beams and also serve, as hereinafter described, as guideways. The longitudinal members 63, 64 are transversely spaced apart and may be positioned substantially equidistant from the mid line of the bed structure 15, or if desired, may be set slightly off center for purposes of balance.

The forward ends of the channels 63, 64 are supported upon the front beam 25 and the rear ends of members 63, 64 are supported upon the rear beam 26. Similarly intermediate portions of the longitudinal members 63, 64 are seated upon and supported by the transverse beam members 31, 33, 35 and 37. It will be seen that the longitudinal members 63, 64 are normally supported upon the transverse members mentioned in loaded or rest position of the device, as shown in Figs. 1, 2, 4, 5, and 6, but are not otherwise connected to the transverse members. The longitudinal members 63, 64 are, however, rigidly connected, preferably as by welding, to the respective tilt members 41, 51 and are adapted to be shifted with the shift of these tilt members.

Thus it will be seen that the trailer bed structure of the present invention includes the supporting frame made up of the beam-like members which are rigidly and unitarily interconnected, a portion of which members consisting of the respective pairs of transverse beam members 31, 33, and 35, 37, respectively form the attachment and mountings for the respective forward and rearward tilt members of the tilt units for the operation of the device, and that the forward tilt unit includes attachment members 31, 33, tilt members 41 and the hydraulic cylinder-and-piston assembly 45, 47 coupled to the tilt members 41 for purposes of moving same to an upright position perpendicular to the bed structure and to and from a position in which the tilt members are substantially in alinement with the channel members 31, 33, and that the rear tilt unit includes rear attachment members 35, 37, tilt members 51 and hydraulic assembly 57, 59 connected for identical purposes.

In addition the bed structure is provided with shiftable and adjustable clamping means which are slidably mounted and are guided in the facing channelways of the elongated longitudinal channel members 63, 64. Preferably the clamping means include a forward clamp plate 66 and a rearward clamp plate 67, each of the clamp plates being preferably provided with bolster members 69, adapted to prevent distortion or bending of the clamp plates in use. Each of the clamp plates is rigidly fixed in perpendicular relation to slide plates 71, 72, which slide plates are rigidly connected, preferably as by welding, to slide members 73, 75, which members are telescopically slidably engaged with the interior of the longitudinal guideway channels 63, 64. Preferably the slide members 73, 75 are formed of channel iron and are nested within the longitudinal channels 63, 64 for longitudinal sliding movement relative to the longitudinal channels. It thus will be seen that the respective clamp plates 66, 67 are disposed substantially perpendicular to the longitudinal beam channels 63, 64 and are adapted for longitudinal sliding movement relative to the channels 63, 64.

Coupled to the forward clamp plate 66 is a piston rod 77 which is adapted for actuation by a double-action clamp cylinder-and-piston assembly, which cylinder-and-piston assembly includes the cylinder 79 supported as by a suitable bracket 81 from the longitudinal beam members 63, 64, the bracket 81 being rigidly fixed to the beam members 63, 64 and supporting the cylinder-and-piston assembly 77, 79 against rocking movement relative to the longitudinal members 63, 64.

Similarly a piston rod 83 is connected to the rear clamp plate 67, the rod 83 being adapted for actuation by a second double-action cylinder-and-piston assembly, which includes a cylinder 85 rigidly connected to the longitudinal members 63, 64 by a second bracket 87, substantially identical with the bracket 81, and holds the rear clamp cylinder-and-piston assembly 83, 85 against rocking movement relative to the longitudinal members 63, 64.

Preferably bed structure 15 is provided with front and rear attachment plates 89, 91 fixed to the under side of the bed structure for the attachment of the running gear thereto. The plate 89 may span between and be rigidly secured to front beam member 25 and front attachment channel 31 and rear plate 91 similarly span between and be rigidly attached to rear beam member 26 and the rearmost attachment member 37. These front and rear plates 89, 91 are so provided in the preferred embodiment of the device in which the running gear is attached to the trailer bed structure, preferably through the medium of substantially conventional fifth wheel devices 93, to which are substantially conventionally attached the front and rear wheel trucks 17, draw bar 21 preferably being connected to the front wheel truck 17.

Rear beam 26 is also provided with a suitable fitting 95 for the detachable coupling thereto of a draw bar 21 of a succeeding trailer structure when the devices are formed into a train consisting of a plurality of trailer units.

Mounted on tractor 19 and driven from the power unit of the tractor is a substantially conventional fluid reservoir and pump unit 97 for supplying hydraulic fluid under pressure for the actuation of the respective hydraulic cylinder-and-piston assemblies hereinabove referred to. Preferably the pump unit 97 is provided with an extension-flow line 98 and a retraction-flow line 99 for flow to and from the tilt actuating cylinders 47, 59, and with an additional extension-flow line 101 and a retraction-flow line 102 for flow to and from the clamp cylinders 79, 85. Flow to and from the tilt cylinders through the lines 98, 99 is preferably controlled through a direction reversing flow valve, not shown, controlled as by a convenient lever 103 while the flow to and from the lines 101, 102 is similarly controlled by a direction reversing valve, not shown, through a suitable control such as a lever 104.

Mounted on the trailer bed structure 15 are extension-flow and retraction-flow lines for flow of hydraulic fluid which are adapted for coupling to the respective lines 98, 99, 101, 102. Preferably each of the tractor-carried lines 98, 99, 101, 102 is provided with a conventional quick coupling fitting which is adapted to receive and be coupled to similar fittings 105, with which the trailer-carried lines are equipped.

An extension-flow line 106 is provided for coupling to line 98. Line 106 leads rearwardly through a suitable mounting 107 extending through the web of front beam member 25, preferably to a similar mounting in the rear beam 26, and intermediate its length is provided with branches 106A, 106B which respectively couple into forward cylinder 47 and into rear tilt cylinder 59 to deliver rod extending flow thereinto. Preferably the rearmost end of line 106 is provided with a quick coupling fitting 205 adapted to receive and have coupled thereto the quick coupler 105 of line 106 of the next succeeding trailer unit.

A retraction-flow line 108 is provided to deliver the rod-retracting flow to the tilt cylinders 47, 59. Line 108 is provided with a coupler 105 by which it is adapted to be connected to the tractor line 99 and extends through a fitting 107 in the front beam 25. At the rear of the trailer the line 108 similarly extends through a fitting 107 in rear beam 26 and is provided with a coupler 205 for connection to line 108 of the next succeeding trailer unit when in train. Intermediate its length line 108 is provided with branches 108A and 108B which respectively connect to cylinders 47, 59, so as to couple those cylinders to line 98, for rod retracting flow thereinto.

An extension-flow line 109 for the clamp cylinders 79, 85 is also provided which extends through a similar fitting 107 in front beam 25 and a rear fitting 107 in rear beam 26. At its forward end line 109 is provided with a quick coupler 105 by which it is adapted to be coupled to line 101 carried by the tractor, and at its rear end the line 109 is provided with a coupler 205 for connection with a line 109 of the next succeeding trailer unit. Intermediate its length line 109 may be provided with a branch 109A, which is adapted to deliver flow to the extension ends of cylinders 78, 79 as through end branches respectively connected into the extension-flow receiving ends of the cylinders 79, 85 for actuation of the clamp cylinders to extend their piston rods and separate the clamp plates.

Retraction-flow to cylinders 79, 85 is carried by a line 110 which similarly extends through fittings 107 respectively in the front and rear beams 25, 26, is provided at its forward end with a coupler 105 for connection to tractor-carried line 102 and at its rear end with coupler 205 for connection to a line 110 of the next succeeding trailer. Intermediate its length line 110 is connected by branch lines 110A and 110B respectively to the retraction-flow ends of cylinders 79 and 85 to deliver piston rod retracting-flow thereto.

In order to minimize tipping of the trailer structure in use during loading and unloading of bulky objects such as cotton bales it has been found desirable to provide the structure with a counterweight and for this purpose an elongated block-like member 112 is preferably seated upon the structure adjacent the ends of transverse beam members 31, 33 and 35, 37 proximate to side member 29 and above the respective connections 49 and 61 of cylinders 47, 59 to side member 29. It is also preferred that counterweight 112 be of a depth equal to the depth of longitudinal beam members 63, 64, so as to serve as an equalizing supporting member underlying bulky parcels or packages resting upon the structure of the trailer. If desired a longitudinal channel member 113 of the same cross-sectional size and shape as the longitudinal beam members 63, 64 may be seated upon side member 29 overlying the ends of transverse channels 31, 33, 35 and 37 and be rigidly secured in position there with the counterweight 112 mounted within the inwardly faced open channel of the beam 113.

Under conditions of heavy load it is considered desirable to provide additional bracing to prevent overbalancing or overtipping of the device during loading and unloading. For this purpose it is preferred to provide the device with retractable brace means respectively positioned adjacent the front and rear ends of the trailer bed and adapted to extend during tilting of the beam structures and to be retracted during the lowering movement of the structure to return loaded position.

In the present embodiment of the construction the retractable brace means is shown as associated with the respective front and rear tilt units hereinbefore mentioned. As best shown in Fig. 9, a post member 115 is rigidly secured to and depends from the under surface of a transverse beam member 31 and a similar post member 115 is rigidly secured to and depends from the under surface of transverse member 33. Spanning between and supported by the post members 115 is a longitudinally disposed stub shaft member 117, upon which is swingably mounted a brace member 119. Connected to the brace member adjacent its lower end is one arm 121 of a control toggle by which movement of the brace member 119 is accomplished. The upper end of toggle arm 121 is articulately connected to an upper toggle arm 123, which, adjacent its opposite end is pivotally connected to pivot blocks 125 connected to and projecting below the under surface of the transverse beam members 31, 33 intermediate their lengths. Preferably the upper toggle arm 123 is formed of a relatively wide channel-like member and is provided at its upper end with an angularly disposed offset, pedal-like portion 127 which projects above the toggle arm. To the upper extremity of the offset portion 127, which, it will be observed, lies between the transverse beam members 31, 33, is a pedal plate 129 which is adapted to lie between the webs of the respective transverse members 31, 33. The plate 129 and the offset portion 127, which offset portion is preferably slightly inclined out of parallelism with the plane of the upper surface of the upper arm 123 so that the plate 129 is disposed at a slight angle of inclination, underlying the tilt members 41.

When the tilt members are in lowered position they engage the plate 129 and cause the plate to be depressed, thus depressing offset portion 127 about the pivotal connection of the upper toggle arm to pivot blocks 125. This accomplishes raising of the articulated joint between the upper arm 123 and lower arm 121, thus retracting the lower arm and causing the brace member 119 to be swung inwardly about shaft 117, lifting the brace member out of bracing condition.

When the tilt members 41 are raised through the operation of the cylinder-and-piston assembly associated therewith the restraint upon the plate 129 is released and the weight of brace member 119 is effective to cause the same to immediately shift downwardly under the force of gravity about shaft 117 until the brace member 119 has moved to a position substantially perpendicular to the post members 115. Preferably brace member 119 is of a length to reach substantially to the ground or floor supporting level when the brace has been extended to the bracing position.

A similar arrangement is employed in connection with the rear tilt unit, it being believed unnecessary to describe the parts in duplicate which are disposed therewith.

In the variation illustrated in Figs. 10 and 11, the bed structure, together with its related parts, is substantially identical with that already described and such description will not be repeated. The bed structure is mounted upon running gear consisting of a conventional warehouse trailer 217, the trailer 217 being provided with an upper supporting surface consisting of longitudinal and transverse beam-like members and with suitable wheels supporting the frame work and with a draw bar 21 connected in usual fashion to the running gear. The transverse beam members 25, 26, 31, 33, 35 and 37 are seated upon and rigidly secured to the upper frame work of trailer 217, thus fixing the bed in position upon the conventional trailer 217, and thus substituting the conventional trailer as the running gear for the trailer unit.

In the use of the device, a trailer draw bar 21 is coupled to the coupling fitting 23 on the tractor 19. The hydraulic lines are connected through the employment of the quick couplers 105 with line 106 being coupled to line 98, line 108 coupled to line 99, line 109 coupled to line 101, and line 110 coupled to line 102, thus effecting fluid communication between the pump 97 and the respective hydraulic cylinders 47, 59, 79 and 85. If it is desired to employ additional units in a train a succeeding draw bar 21 is coupled to the rear fitting 95 of the trailer and couplings effected between the hydraulic lines of the successive trailer with the rear ends of the lines of the trailer already connected to the pump 97.

In loading the device it may be moved as to a loading station where a plurality of objects, such as a plurality of cotton bales, are arranged in substantial alinement in the manner conventional in cotton warehousing. With the trailer moved alongside the alined bales fluid flow from pump 97 through lines 98 and 106 and the branches of line 106 into the tilt cylinders 47, 59 is accomplished through valve manipulation by lever 103. The actuation of the cylinders 47, 59 under the pressure thus delivered to them effects extension of the piston rods 45, 57, thus effecting rocking of tilt members 41, 51 about rock shafts 39, 53 and moving with the tilt members the longitudinal beams 63, 64 and the sliding clamp structures carried thereby, together with the clamp actuating cylinders also carried by the beams 63, 64. The movement accomplished through the extension of the piston rods 45, 57 moves the tilt members 41, 51 through an arc of ninety degrees to a position in which the tilt members are disposed substantially perpendicular to the attachment channels 31, 33, and 35, 37, in which position the clamp plates 66, 67 are extending laterally from the device and are positioned with their normally upper ends extending outwardly away from the bed of the trailer. Preferably at such time the clamp plates 66, 67 should be at their greatest extent respectively toward the front and rear of the trailer in order to provide maximum clearance away from the bales or other parcels which are to be engaged, and when thus the beam and clamp srtuctures have been tilted through the operation of the tilt cylinders, as described, the clamp plates will be extending laterally outwardly so as to embrace the ends of the alined bales which are awaiting loading.

With the device thus positioned clamp cylinders 79, 85 are actuated through the manipulation of lever 104 effecting discharge of fluid through line 102 into line 110 and through line 110 into the respective cylinders to establish piston retracting flow to cylinders 79, 85, effecting retraction of the piston rods 77, 83, shifting the clamp plates 66, 67 along their sliding mount in the longitudinal channels 63, 64 until the plates have been moved into tight engagement with the alined bales awaiting loading, by which engagement the bales are clamped for lifting. With the bales thus engaged and clamped by the clamping movement of the forward and rearward clamp plates 66, 67 the device is ready to load the bales onto the trailer.

The valve lever 103 is accordingly manipulated to reverse the flow toward the tilt cylinders, establishing flow through lines 99 and 108 to the retraction end of cylinders 47, 59 and permitting return flow through lines 106 and 98 to the pump. When the retraction flow to the respective cylinders is established the piston rods 45, 57 are retracted into the cylinder assemblies, drawing the tilt members 41, 51 downwardly from perpendicular position to horizontal rest position. This movement of the tilt members 41, 51 brings with them the longitudinal channels 63, 64 by which the clamp members are carried and consequently brings with the return movement the bales engaged between the clamp members 66, 67. These bales are thus deposited upon the bed of the trailer structure and are supported upon the upper flanges of longitudinal channels 63, 64 and upon counter-weight channel 113.

It will be observed that during a preliminary portion of the movement of tilt members 41, 51 from horizontal position toward perpendicular position, and in approximately the first fifteen degrees of arcuate movement of the tilt members, the restraint exercised upon pedal plate 129 by the tilt members 41, 51 is released and brace 119 is extended to its full bracing position before the tilt members have been extended to perpendicular position and before the clamp members have been extended to embrace the parcels to be engaged thereby. This bracing condition of brace member 119 thus extended during a preliminary portion of the movement toward tilting loaded position continues throughout the loading operation just described, with the brace member being in extended position until the last approximately fifteen degrees of the return movement of the tilt members to horizontal position. It will be seen that at this time the weight of the bales engaged by the clamps has been moved over the bed of the structure and the further downward movement of the bales and the longitudinal beams and clamp members is adequately supported by the trailer structure. During the last minor arc of movement of the tilt members downwardly toward horizontal position the pedal plate 129 is reengaged by the tilt members 41, 51 and retraction of extensible brace member 119 is effected, substantially to the position shown in dotted lines in Fig. 9.

In the unloading of the device, the same operations are followed through, with the tilt cylinders 47, 59 being actuated as before to effect raising of the tilt members 41, 51 about the rock shafts, thus raising the longitudinal beams and clamp members and the bales carried thereby, extending same over the edge of the trailer structure.

It will again be observed that during the preliminary portion of this movement the extensible brace member 119 is extended to its bracing position, which, in the present embodiment, is illustrated as being substantially perpendicular to the bed structure and thus effectively provides a brace against overtipping of the structure during the shift of the weight of the bales from above the bed structure to a lateral position. When the structure has been moved to the tilted position the actuation of clamp cylinders 79, 85 may then be reversed, extending the clamps away from the bales previously engaged and releasing the bales in deposited position. The tilt cylinders may then be reversed in action and return the structure to its horizontal rest position where it is ready to again load a subsequent load.

During these operations the counterweight 112 is substantially effective in preventing overbalancing of the structure during shift of the weight of the cargo carried thereby, and is effective in the case of light loads without the necessity of the intervention of the brace member 119. However, inasmuch as the present invention contemplates the handling of substantially weighty loads it is desirable to provide an extensible brace member, such as the brace member 119, for the purposes of insuring against the overtipping of the device during loading and unloading of such cargoes.

When trailers fabricated in accordance with this invention are coupled in a train, as contemplated, each of the trailers operates in the manner described. It has been found that the entrained trailers do not operate concurrently in the loading and unloading movement due to variations in the weight of loads to be handled, as a result of which the hydraulic system becomes effective first at the point of least resistance or of lightest load to be shifted, and successively operates the trailers in the order of increasing load weight to be handled. As a result the system is required to operate a portion only of the entire aggregate load at a given time avoiding danger of overloading the system and permitting use of a desired plurality of trailers in a single train within the motive limits of the tractor.

It will be seen that we have developed a load handling structure particularly adapted for use in warehouses which may be employed with suitable running gear to provide a trailer unit, and where the running gear is a conventional trailer accomplishes conversion of such conventional trailer to a material handling self-loading and unloading structure.

We claim:

1. In a trailer structure, a load handling and supporting bed comprising a peripheral frame, a pair of transverse beam members adjacent one end of said frame, a second pair of transverse beam members adjacent the opposite end of said frame, said transverse beam members spanning from side to side of and rigidly fixed to said frame, the members of each said pair being longitudinally spaced apart, transverse tilt members pivotally connected at one end to said beam members respectively and being shiftable from and to a loaded position in which said tilt members are substantially alined with said beam members to and from a tilted position in which said tilt members are substantially perpendicular to said beam members, hydraulic tilt actuating means connected to said tilt members adjacent their opposite ends adapted to alternately shift said tilt members to said tilted position and return to said loaded position, longitudinally disposed channel members rigidly fixed to and shiftable with said tilt members, said channel members being of a length to overlie and rest upon the ends of said frame and being supported on said transverse beams in said loaded position, a pair of longitudinally spaced clamp plates, clamp plate supports telescopically and slidably engaging said channels, said supports being fixed to said plates respectively and supporting said plates perpendicular to said channels, hydraulic clamp actuating means supported by said channels and connected to said clamp plates, said clamp actuating means being adapted to shift said clamp plates along said channels to vary the spacing between said plates, shift of said tilt members to said tilted position shifting said clamp plates to project laterally beyond a side of said frame to embrace a load adjacent said frame, actuation of said clamp means shifting said clamp plates into clamping engagement with an embraced load for shift thereof upon return movement of said tilt members to said loaded position, hydraulic means for delivering actuating flow to said tilt actuating means and to said clamp actuating means; and wheeled means supporting said bed.

2. In a trailer structure, a load handling and supporting bed comprising a peripheral frame, transverse beam means respectively adjacent the opposite ends of said frame, said transverse beam means spanning from side to side of and being rigidly fixed to said frame, transverse tilt members pivotally connected at one end to said beam means respectively and being shiftable from and to a loaded position in which said tilt members are substantially alined with said beam means to and from a tilted position in which said tilt members are substantially perpendicular to said beam means, hydraulic tilt actuating means connected to said tilt members adjacent their opposite ends adapted to alternatively shift said tilt members to said tilted position and return to said loaded position, longitudinally disposed channel members rigidly fixed to and shiftable with said tilt members, said channel members being of a length to overlie and rest upon the ends of said frame and being supported on said transverse beam means in said loaded position, a pair of longitudinally spaced clamp plates, clamp plate supports telescopically and slidably engaging said channels, said supports being fixed to said plates respectively and supporting said plates perpendicular to said channels, hydraulic clamp actuating means supported by said channels and connected to said clamp plates, said clamp actuating means being adapted to shift said clamp plates along said channels to vary the spacing between said plates, shift of said tilt members to said tilted position shifting said clamp plates to project laterally beyond a side of said frame to embrace a load adjacent said frame, actuation of said clamp means shifting said clamp plates into clamping engagement with an embraced load for shift thereof upon return movement of said tilt members to said loaded position, hydraulic means for delivering actuating flow to said tilt actuating means and to said clamp actuating means; and wheeled means supporting said bed.

3. In a trailer structure, a load handling and supporting bed comprising a peripheral frame, transverse beams respectively adjacent the opposite ends of said frame, said transverse beams spanning from side to side of and being rigidly fixed to said frame, transverse tilt members pivotally connected at one end to said beams respectively and being shiftable from and to a loaded position in which said tilt members are substantially alined with said beams to and from a tilted position in which said tilt members are substantially perpendicular to said beams, hydraulic tilt actuating means connected to said tilt members adjacent their opposite ends adapted to shift said tilt members and to form said tilted position and from and to said loaded position, longitudinally disposed channel members rigidly fixed to and shiftable with said tilt members, said channel members being of a length to overlie and rest upon the ends of said frame and being supported on said transverse beams in said loaded position, a pair of longitudinally spaced clamp plates, clamp plate supports slidably engaging said channels, said supports being fixed to said plates respectively and supporting said plates perpendicular to said channels, hydraulic clamp actuating means supported by said channels and connected to said clamp plates, said clamp actuating means being adapted to shift said clamp plates along said channels to vary the spacing between said plates, shift of said tilt members to said tilted position shifting said clamp plates to project laterally beyond a side of said frame to embrace a load adjacent said frame, actuation of said clamp means shifting said clamp plates into clamping engagement with an embraced load for shift thereof upon return movement of said tilt members to said loaded position, and hydraulic means for delivering actuating flow to said tilt actuating means and to said clamp actuating means.

4. In a trailer structure, a load handling and supporting bed comprising a frame, a pair of longitudinally disposed beam members supported on said frame, transverse members rigidly connected to said beam members and pivotally connected to said frame, the pivotal connections being laterally offset from said beam members, for tilting movement relative to said frame, said transverse members connecting said beam members to said frame, hydraulic shift actuating means connected to said transverse members adapted to shift said transverse members relative to said frame, a pair of longitudinally spaced clamp plates, clamp plate supports slidably engaging said beam members, said supports being fixed to said plates respectively and supporting said plates perpendicular to said beam members, hydraulic clamp actuating means supported by said beam members and connected to said clamp plates, said clamp actuating means being adapted to shift said clamp plates along said beam members to vary the spacing between said plates, shift of said members shifting said clamp plates to project laterally beyond a side of said frame to embrace a load adjacent said frame, actuation of said clamp means shifting said clamp plates into clamping engagement with an embraced load for shift thereof upon return movement of said tilt members to said loaded position, hydraulic means for delivering actuating flow to said shift actuating means and to said clamp actuating means; and wheeled means supporting said bed.

5. A load handling and supporting bed adapted for use in a trailer structure, comprising a peripheral frame, a pair of transverse beam members adjacent one end of said frame, a second pair of transverse beam members adjacent the opposite end of said frame, said transverse beam members spanning from side to side of and rigidly fixed to said frame, the members of each said pair being longitudinally spaced apart, transverse tilt members pivotally connected at one end to said beam members respectively and being shiftable from and to a loaded position in which said tilt members are substantially alined with said beam members to and from a tilted position in which said tilt members are substantially perpendicular to said beam members, hydraulic cylinder and piston tilt actuating means connected to said tilt members adjacent their opposite ends adapted on extension to shift said tilt members to said tilted position and on retraction to shift said tilt members to said loaded position, longitudinally disposed channel members rigidly fixed to and shiftable with said tilt members, said channel members being of a length to overlie and rest upon the ends of said frame and being supported on said transverse beams in said loaded position, a pair of longitudinally spaced clamp plates, clamp plate supports telescopically and slidably engaging said channels, said supports being fixed to said plates respectively and supporting said plates perpendicular to said channels, hydraulic cylinder and piston clamp actuating means supported by said channels and connected to said clamp plates, said clamp actuating means being adapted to shift said clamp plates along said channels to vary the spacing between said plates, shift of said tilt members to said tilted position shifting said clamp plates to project laterally beyond a side of said frame to embrace a load adjacent said frame, actuation of said clamp means shifting said clamp plates into clamping engagement with an embraced load for shift thereof upon return movement of said tilt members to said loaded position, and hydraulic means for delivering actuating flow to said tilt actuating means and to said clamp actuating means.

6. A load handling and supporting bed adapted for use in a trailer structure, comprising a rigid framework, transverse tilt members pivotally connected at one end to said framework and being shiftable from and to a loaded position in which said tilt members are substantially alined with said framework to and from a tilted position in which said tilt members are substantially perpendicular to said framework, hydraulic cylinder and piston tilt actuating means connected to said tilt members adjacent their opposite ends adapted on extension to shift said tilt members to said tilted position and on retraction to shift said tilt members to said loaded position, longitudinally disposed channel members rigidly fixed to and shiftable with said tilt members, said channel members being of a length to overlie and rest upon the ends of said frame and being supported on said framework in said loaded position, a pair of longitudinally spaced clamp plates, clamp plate supports telescopically and slidably engaging said channels, said supports being fixed to said plates respectively and supporting said plates perpendicular to said channels, hydraulic cylinder and piston clamp actuating means supported by said channels and connected to said clamp plates, said clamp actuating means being adapted to shift said clamp plates along said channels to vary the spacing between said plates, shift of said tilt members to said tilted position shifting said clamp plates to project laterally beyond a side of said framework to embrace a load adjacent said frame, actuation of said clamp means shifting said clamp plates into clamping engagement with an embraced load for shift thereof upon return movement of said tilt members to said loaded position, hydraulic means for delivering actuating flow to said tilt actuating means and to said clamp actuating means, and brace means extensible to bracing position responsive to and in cooperation with a primary portion of shift away from said loaded position.

7. In a trailer structure, a load handling and supporting bed comprising forward and rearward tilt units, said units including hydraulic actuating means, tilt members connected to said means for shift toward and away from said bed, beam members rigidly connected to said tilt members and shiftable therewith, clamping means carried by said beam members, and brace means, extensible responsive to and in cooperation with a preliminary portion of the shifting movement of said tilt members away from said bed, said brace means including brace members respectively swingably associated with said units, toggle means connected to said units and to said brace members, said toggle means each including an offset pedal portion lying in the path of movement of said tilt members, and being depressed and restrained by said tilt members under shift toward said bed, tilt member shift away from said bed releasing said pedal restraint, said brace members being gravity biased to extend when said restraint is released.

8. In a trailer structure, a load handling and supporting bed comprising forward and rearward tilt units, said units including hydraulic actuating means, tilt members connected to said means for shift toward and away from said bed, load engaging means rigidly connected to said tilt members and shiftable therewith, and brace means, extensible responsive to and in cooperation with a preliminary portion of the shifting movement of said tilt members away from said bed, said brace means including brace members respectively swingably associated with said units, toggle means connected to said units and to said brace members, said toggle means each including an offset pedal portion lying in the path of movement of said tilt members, and being depressed and restrained by said tilt members under shift toward said bed, tilt member shift away from said bed releasing said pedal restraint, said brace members being biased to extend when said restraint is released.

9. In a trailer structure, a load handling and supporting bed comprising forward and rearward tilt units, said units including hydraulic actuating means, load engaging means connected to said actuating means for shift toward and away from said bed, and brace means, extensible responsive to and in cooperation with a preliminary portion of the shifting movement of said load engaging means away from said bed, said brace means including brace members respectively swingably associated with said units, toggle means connected to said units and to said brace members, said toggle means each including an offset pedal portion lying in the path of movement of said load engaging means and being depressed and restrained by said load engaging means under shift toward said bed, load shift away from said bed releasing said pedal restraint to free said brace members to extend to bracing position.

10. Bracing means in combination with a load handling trailer structure which includes fixed framework and shiftable load engaging means, said bracing means including a brace swingably supported from said framework for movement to and from a retracted position underlying said framework from and to an extended position projecting from said framework, a lower arm pivotally connected to said brace, an upper arm pivoted to said framework, said arms being articulated to form a toggle, an offset portion connected to said toggle and lying in the path of movement of said shiftable load engaging means, engagement of said offset portion by said load engaging means actuating said toggle to move said brace to said retracted position, shift of said load engaging means away from said offset portion releasing said toggle for shift of said brace to said extended position, and means for shifting said load engaging means.

11. A load handling and supporting bed adapted for use in a trailer structure comprising a rigid frame, including transverse frame elements, longitudinally disposed members tiltably supported on said frame in transversely spaced relation, said members each having an upper load-supporting surface and being of a length to extend substantially from end to end of said frame, said transverse frame elements including elements intermediate the length of said frame and spanning from side to side thereof, said intermediate elements being spaced respectively rearwardly and forwardly from the front and rear ends of said frame, tilt members pivotally connected to said transverse elements adjacent but inwardly of one side of said frame, the pivotal connections being spaced from said load-supporting surfaces a distance substantially equal to the distance of said pivotal connections from said one frame side, said tilt members being rigidly fixed to said longitudinal members, tilt actuating means connected to said tilt members to shift said tilt members and said longitudinal members about said pivotal connection, clamp means slidably supported substantially perpendicular to said longitudinal members, and clamp actuating means supported by said longitudinal members, said actuating means being coupled to said clamp means for shift of said means along said longitudinal members.

12. A load handling and supporting bed adapted for use in a trailer structure comprising a rigid frame, including side longitudinal frame elements and transverse frame elements, longitudinally disposed members tiltably supported on said frame in transversely spaced relation intermediate said longitudinal frame elements, said members each having an upper load-supporting surface spaced above said frame and being of a length to extend substantially from end to end of said frame, said transverse frame elements including elements intermediate the length of said frame and spanning from side to side thereof, said intermediate elements being spaced respectively rearwardly and forwardly from the front and rear ends of said frame, tilt members pivotally connected to said transverse elements adjacent but inward of one longitudinal side frame element, said tilt members being rigidly fixed to said longitudinal members, tilt actuating means connected to said tilt members to shift said tilt members and said longitudinal members about said pivotal connection, clamp means shiftably supported substantially perpendicular to said longitudinal members, and clamp actuating means supported by said longitudinal members, said actuating means being coupled to said clamp means for shift of said clamp means along said longitudinal members into and out of engagement with a load supported on said surfaces.

13. A load handling and supporting bed adapted for use in a trailer structure comprising a rigid frame, longitudinally disposed channel members tiltably supported on said frame, means connected with said channel members and said frame for tilt shift of said members to and from said frame, a pair of longitudinally spaced clamp plates, clamp plate supports telescopically and slidably engaging the channels of said channel members, said plates being rigidly fixed to said supports and supported substantially perpendicular to said channel members, clamp actuating means supported by said channel members, said actuating means being coupled to said clamp plates for shift of said plates along said channel members, and brace means coupled to said frame extensible to bracing position during shift of said channel members away from said frame.

14. A load handling and supporting bed adapted for use in a trailer structure comprising a rigid frame, longitudinally disposed channel members tiltably supported on said frame, each said channel member including a load-supporting surface spaced above said frame, means connected with said channel members and said frame, adjacent one side of said frame, for tilt shift of said members to and from said frame, the connections of said means to said frame being spaced inwardly from said one side a distance substantially equal to the distance of said connections from said surface, a pair of longitudinally spaced clamp plates, clamp plate supports telescopically and slidably engaging the channels of said channel members, said plates being rigidly fixed to said supports and supported substantially perpendicular to said channel members, and clamp actuating means supported by said channel members, said actuating means being coupled to said plates for shift of said plates along said channel members.

15. A load handling and supporting bed adapted for use in a trailer structure comprising a rigid frame, longitudinally disposed members tiltably supported on said frame, each said member including a guideway extending substantially from end to end of the member, longitudinally extending load-supporting surfaces forming respectively part of each said members above said guideway, means connected with said members and said frame for tilt shift of said members to and from said frame, a pair of longitudinally spaced clamp plates, clamp plate supports telescopically and slidably engaging said guideways, said plates being rigidly fixed to said supports and supported substantially perpendicular to said members, and clamp actuating means supported by said members, said actuating means being coupled to said clamp plates for shift of said plates along said guideways and members.

16. A load handling and supporting bed adapted for use in a trailer structure comprising a rigid frame, longitudinally disposed channel members tiltably supported on said frame in transversely spaced relation, said channel members each having an upper load-supporting surface and a guideway facing the other channel member and being of a length to extend substantially from end to end of said frame, front and rear tilt assemblies secured to said channel members spaced respectively rearwardly and forwardly from the front and rear ends of said members, means pivotally connecting part of each said assembly with said frame for tilt shift of said members to and from said frame, said connecting means being inset from one side of said frame and offset from said surface, tilt actuating means connected to said assemblies, a pair of longitudinally spaced clamp plates, positioned between said channel members, clamp plate supports telescopically and slidably engaging said facing guideways below said load-supporting surfaces, said plates being rigidly fixed to said supports and supported substantially perpendicular to said channel members, and clamp actuating means supported by said channel members, said actuating means being coupled to said clamp plates for shift of said plates along said channel member guideways.

17. A load handling and supporting bed adapted for use in a trailer structure comprising a rigid frame, longitudinally disposed channel members tiltably supported on said frame in transversely spaced relation, said channel members each having an upper load-supporting surface and a guideway facing the other channel member and being of a length to extend substantially from end to end of said frame, front and rear tilt assemblies secured to said channel members spaced respectively rearwardly and forwardly from the front and rear ends of said members, part of each assembly being pivotally connected with said frame for tilt shift of said members to and from said frame, tilt actuating means connected to said assemblies, a pair of longitudinally spaced clamp plates, positioned between said channel members, clamp plate supports telescopically and slidably engaging said facing guideways below said load-supporting surfaces, said plates being rigidly fixed to said supports and supported substantially perpendicular to said channel members, hydraulic clamp actuating means supported by said channel members, said actuating means being coupled to said clamp plates for shift of said plates along said channel member guideways, and brace means extensible to bracing position during shift of said channel members away from said frame.

18. A load handling and supporting bed adapted for use in a trailer structure comprising a rigid frame, longitudinally disposed members tiltably supported on said frame in transversely spaced relation, said members each having an upper load-supporting surface and being of a length to extend substantially from end to end of said frame, front and rear tilt assemblies secured to said members spaced respectively rearwardly and forwardly from the front and rear ends of said members, part of each said asssembly being pivotally connected with said frame for tilt shift of said members to and from said frame, tilt actuating means connected to said assemblies, a pair of longitudinally spaced clamp plates, clamp plate supports slidably engaging said members, said plates being rigidly fixed to said supports and supported substantially perpendicular to said members, hydraulic clamp actuating means supported by said members, said actuating means being coupled to said clamp plates for shift of said plates along said member guideways, and brace means extensible to bracing position during shift of said members away from said frame.

19. A load handling and supporting bed adapted for use in a trailer structure comprising a rigid frame, longitudinally disposed channel members tiltably supported on said frame in transversely spaced relation, said channel members each having an upper load-supporting surface spaced above said frame and a guideway facing the other channel member, means connected with said channel members and said frame for tilt shift of said members to and from said frame, the connections of said frame being inset from one side of said frame and offset from said surface, a pair of longitudinally spaced clamp plates, positioned between said channel members, clamp plate supports telescopically and slidably engaging said facing guideways below said load-supporting surfaces, said plates being rigidly fixed to said supports and supported substantially perpendicular to said channel members, and clamp actuating means supported by said channel members, said actuating means being coupled to said clamp plates for shift of said plates along said channel member guideways.

20. A load handling and supporting bed adapted for use in a trailer structure comprising a rigid frame, longitudinally disposed channel members tiltably supported on said frame in transversely spaced relation, said channel members each having an upper load-supporting surface and a guideway facing the other channel member, means connected with said channel members and said frame for tilt shift of said members to and from said frame, the connections of said means to said frame being spaced from said surfaces and inset from one side of said frame substantially equal distances, a pair of longitudinally spaced clamp plates, positioned between said channel members, clamp plate supports telescopically and slidably engaging said facing guideways below said load-supporting surfaces, said plates being rigidly fixed to said supports and supported substantially perpendicular to said channel members, and hydraulic clamp actuating means supported by said channel members, said actuating means being coupled to said clamp plates for shift of said plates along said channel member guideways.

21. A load handling and supporting bed adapted for use in a trailer structure, comprising a rigid frame, longitudinally disposed channel members tiltably supported on said frame in transversely spaced relation, said channel members each having an upper load-supporting surface and a guideway facing the other channel member, means connected with said channel members and said frame for tilt shift of said members to and from said frame, a pair of longitudinally spaced clamp plates, positioned between said channel members, clamp plate supports telescopically and slidably engaging said facing guideways below said load-supporting surfaces, said plates being rigidly fixed to said supports and supported substantially perpendicular to said channel members, hydraulic clamp actuating means supported by said channel members, said actuating means being coupled to said clamp plates for shift of said plates along said channel member guideways, and brace means extensible to bracing position during shift of said channel members away from said frame.

22. A load handling and supporting bed adapted for use in a trailer structure comprising a rigid frame, longitudinally disposed members tiltably supported on said frame in transversely spaced relation intermediate the sides of said frame, said members each having an upper load-supporting surface spaced above said frame and being of a length to extend substantially from end to end of said frame, tilt members rigidly fixed to said longitudinal members and pivotally connected with said frame, the pivotal connections being laterally offset from said longitudinal members and adjacent one side of said frame and respectively spaced a distance substantially equal to the amount of said offset rearwardly and forwardly from the front and rear ends of said frame, tilt actuating means connected to said tilt members to shift said tilt members and said longitudinal members about said pivotal connection, and clamp means supported by said longitudinal members for engagement with a load on said surfaces.

23. A load handling and supporting bed adapted for use in a trailer structure comprising a rigid frame, longitudinally disposed members tiltably supported on said frame in transversely spaced relation intermediate the sides of said frame, said members each having an upper load-supporting portion and being of a length to extend throughout the majority of the length of said frame, tilt members rigidly fixed to said longitudinal members and pivotally connected with said frame, the pivotal connections being laterally offset from said longitudinal members and adjacent one side of said frame, said tilt members being respectively spaced rearwardly and forwardly from the front and rear ends of said frame, tilt actuating means connected to said tilt members to shift said tilt members and said longitudinal members about the laterally offset pivotal connections, clamp means supported by said longitudinal members, and clamp actuating means supported by said longitudinal members, said actuating means being coupled to said clamp means for shift of said clamp means along said longitudinal members into and out of engagement with a load on said surfaces.

24. A load handling and supporting bed adapted for use in a trailer structure comprising a rigid frame, longitudinally disposed members tiltably supported above said frame in transversely spaced relation intermediate the sides of said frame, said members each having an upper load-supporting surface spaced above said frame, tilt members rigidly fixed to said longitudinal members and pivotally connected with said frame, the pivotal connections being laterally offset from said longitudinal members and adjacent but inward of one side of said frame, said pivotal connections being spaced from said load supporting surfaces a distance substantially equal to the distance of said pivotal connections from said one frame side, tilt actuating means connected to said tilt members to shift said tilt members and said longitudinal members about said pivotal connection to and from a tilted position in which said load supporting surfaces are substantially vertically alined with said one frame side, and clamp means carried by said longitudinal members for releasable engagement with a load on said surfaces.

References Cited in the file of this patent

UNITED STATES PATENTS

| | | |
|---|---|---|
| 2,072,998 | Allin | Mar. 9, 1937 |
| 2,189,052 | Anthony | Feb. 6, 1940 |
| 2,487,305 | Bridegroom | Nov. 8, 1949 |
| 2,508,698 | Von Beren | May 23, 1950 |
| 2,520,252 | Mutchler | Aug. 29, 1950 |
| 2,571,550 | Ehmann | Oct. 16, 1951 |
| 2,575,552 | Glenn, Jr. | Nov. 20, 1951 |
| 2,613,827 | Van Doorne | Oct. 14, 1952 |
| 2,647,650 | Sherriff | Aug. 4, 1953 |

FOREIGN PATENTS

| | | |
|---|---|---|
| 465,400 | Germany | Sept. 17, 1928 |